United States Patent
Feast et al.

(10) Patent No.: US 11,503,086 B2
(45) Date of Patent: *Nov. 15, 2022

(54) METHOD AND APPARATUS FOR OPPORTUNISTIC SYNCHRONIZING OF TELE-COMMUNICATIONS TO PERSONAL MOBILE DEVICES

(71) Applicant: Cogito Corporation, Boston, MA (US)

(72) Inventors: Joshua Feast, Boston, MA (US); Ali Azarbayejani, Boston, MA (US); Skyler Place, Boston, MA (US)

(73) Assignee: Cogito Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,949

(22) Filed: Sep. 3, 2021

(65) Prior Publication Data

US 2021/0400089 A1     Dec. 23, 2021

Related U.S. Application Data (63) Continuation of application No. 16/718,365, filed on Dec. 18, 2019, now Pat. No. 11,115,443, which is a
(Continued)

(51) Int. Cl.
  *H04L 65/1069*   (2022.01)
  *H04L 67/54*   (2022.01)
  *H04L 67/50*   (2022.01)

(52) U.S. Cl.
  CPC ........ *H04L 65/1069* (2013.01); *H04L 67/535* (2022.05); *H04L 67/54* (2022.05)

(58) Field of Classification Search
  CPC ..... H04L 65/1069; H04L 67/22; H04L 67/24; A61B 5/1135; G06Q 50/00; G08G 1/01;
  (Continued)

(56) References Cited

U.S. PATENT DOCUMENTS

| 7,127,412 B2 | 10/2006 | Powell et al. |
| 7,983,661 B2 | 7/2011 | Purontaus et al. |

(Continued)

FOREIGN PATENT DOCUMENTS

| JP | 2004172669 A | 6/2004 |
| JP | 2005051554 A | 2/2005 |
| WO | 200230093 A2 | 4/2002 |

OTHER PUBLICATIONS

Das, S. K. and Cook, D. J., Health Monitoring in an Agent-Based Smart Home by Activity Prediction, Center for Research in Wireless Mobility and Networking, Department of Computer Science Engineering, The University of Texas at Arlington, 2003.
(Continued)

*Primary Examiner* — Le H Luu
(74) *Attorney, Agent, or Firm* — Kim IP Law Group LLC (57) ABSTRACT

The disclosed system captures real-time data regarding a mobile device user's receptivity to interacting, need to interact, and likely availability for interacting; matches this data with that of a second party; and facilitates the connection of the mobile device user to the second party for a mutually beneficial interaction. The second party could be a friend or peer, or an organization/enterprise. Overall, the integrated system saves time, money, and effort of both parties by reducing or eliminating unnecessary attempts to connect where there is an insufficient likelihood of interaction success.

24 Claims, 6 Drawing Sheets

Related U.S. Application Data continuation of application No. 15/978,955, filed on May 14, 2018, now Pat. No. 10,567,444, which is a continuation of application No. 14/170,974, filed on Feb. 3, 2014, now abandoned.

(58) Field of Classification Search
CPC ...... G16H 10/60; H04W 12/065; H04W 4/02; H04W 4/18
See application file for complete search history.

(56) References Cited

U.S. PATENT DOCUMENTS

| | | | |
|---|---|---|---|
| 8,041,365 B1 | 10/2011 | Gentle et al. | |
| 8,116,727 B1 | 2/2012 | Kates et al. | |
| 2004/0073128 A1* | 4/2004 | Hatlestad | A61B 5/1135 600/533 |
| 2007/0238443 A1 | 10/2007 | Richardson | |
| 2007/0260735 A1 | 11/2007 | Olsson et al. | |
| 2008/0004793 A1* | 1/2008 | Horvitz | G08G 1/01 701/487 |
| 2009/0163182 A1 | 6/2009 | Gatti et al. | |
| 2010/0023348 A1* | 1/2010 | Hardee | G06Q 50/00 600/300 |
| 2010/0299615 A1* | 11/2010 | Miluzzo | H04W 4/02 715/752 |
| 2012/0120922 A1 | 5/2012 | Huang et al. | |
| 2012/0323997 A1 | 12/2012 | Mezhibovsky et al. | |
| 2013/0035076 A1 | 2/2013 | Aaron et al. | |
| 2013/0054467 A1 | 2/2013 | Dala et al. | |
| 2013/0060587 A1 | 3/2013 | Bayrak et al. | |
| 2013/0091146 A1 | 4/2013 | Stanger | |
| 2013/0095807 A1 | 4/2013 | Bhaumik et al. | |
| 2013/0124224 A1* | 5/2013 | Srinivasan | G16H 10/60 705/2 |
| 2014/0032691 A1 | 1/2014 | Barton et al. | |
| 2015/0067017 A1* | 3/2015 | Shah | H04W 4/18 709/202 |
| 2015/0111535 A1* | 4/2015 | Song | H04W 12/065 455/26.1 |
| 2015/0127710 A1 | 5/2015 | Ady et al. | |
| 2018/0262539 A1 | 9/2018 | Feast et al. | |

OTHER PUBLICATIONS

De Choudhury, M. et al., Context Aware Routing of Enterprise User Communications, 2007 IEEE International Conference on Pervasive Computing and Communications Workshops, Mar. 19-23, 2007, White Plains, NY.

Wang, Y. et al., Real-Time Scheduling for Multi-Agent Call Center Automation, Recent Advances in AI Planning, 5th European Conference on Planning, Sep. 8-10, 1999, Durham, UK.

* cited by examiner

METHOD AND APPARATUS FOR OPPORTUNISTIC SYNCHRONIZING OF TELE-COMMUNICATIONS TO PERSONAL MOBILE DEVICES

CROSS-REFERENCE TO RELATED APPLICATIONS

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2014 Cogito Corp.

BACKGROUND

Field of Technology

This disclosure relates to the use of personal mobile devices to synchronize human communications, and more specifically to utilizing passive mobile device monitoring to optimize the reachability and quality associated with synchronous telephonic interactions.

Background

One of the most frustrating problems associated with the rise of mobile telephone devices includes the large numbers of synchronous interaction attempts that do not connect, or occur when the person that one is trying to reach is not in a good position to talk, or occur when the person one is trying to reach does not need or is not interested in the contact. This situation has come about because possession of a mobile device provides the presumption that a user is always available for a synchronous conversation, when in fact that is frequently not the case. Consequently, a tremendous amount of unnecessary effort is expended by organizations and individuals on attempting to unsuccessfully to reach their intended party, and, on the flip-side, individuals frequently receive calls from organizations that they are not interested in receiving or that do not come in at a convenient time.

From an enterprise market perspective, research and development focused on customer connections to and from an enterprise call center has been around for some time. Consumer reachability and engagement are critical operational and strategic problems. However, the art so far has not found effective ways to connect the call center with a customer mobile experience in an intuitive way that is adoptable by customers. With the rise of mobile technologies, enterprise business units that wish to have proactive human-to-human conversations with customers are struggling to get customers on the phone, and the quality of the interactions has suffered markedly. Furthermore, as a consumer, the fact that this problem has not been solved yet causes frustration and wasted time every day. Customers frequently receive unwelcome calls at inopportune times and have trouble reaching a human at the enterprise when needed.

It should also be noted that enterprise has attempted to solve the reachability problem using automatic Interactive Voice Response technologies, i.e. outbound "robocalls". Although this tactic can help an enterprise with reachability, in practice it can also create a poor experience for customers and bother them at inopportune times.

Additionally, from a consumer perspective, a significant amount of effort is spent trying to reach friends and peers by telephone, with attendant voice messages, text messages to schedule calls, and attempts to call back.

DESCRIPTION OF PRIOR ART

United States Patent Application Publication 2012/0323996 "Context Aware Interaction" (Mezhibovsky et al. Dec. 20, 2012) discloses, in the Abstract, "A network-connected server for meeting initiation has software executing on the server from a non-transitory physical medium, the software providing a function allowing a user to schedule a meeting and to configure availability conditions, a function for informing scheduled participants of the scheduled meeting, a function for receiving indications of availability for the scheduled meeting from communication appliances associated with scheduled participants, and a function for connecting the communication appliances to communicate when the configured availability conditions are met."

United States Patent Application Publication 2013/0060587 "Determining Best Time to Reach Customers in a Multi-Channel World Ensuring Right Party Contact and Increasing Interaction Likelihood" (Bayrak et al. Mar. 7, 2013) discloses, in the Abstract, "Estimating best time to contact a customer may include estimating a statistical model which computes a score for determining a successful contact with the customer for the time period based on a first set of historical customer contact data. A second set of historical customer contact data associated with at least one customer may be received and the score of a successful contact may be provided for the customer based on the second set of historical data and the estimated statistical model."

United States Patent Application Publication 2013/0035076 "Determining an Availability Status of a Contact Being Called" (Aaron et al. Feb. 7, 2013) discloses, in the Abstract, "In a method for placing a telephone call, a telephone receives a request to call a contact. The telephone retrieves a user preference for obtaining an availability status of the contact. The telephone obtains the availability status of the contact from one of a plurality of sources based at least in part on an order of priority of the sources defined by the user preference. The sources include a social network program. The telephone displays the status of the contact. The telephone prompts for a decision whether to place the call to the contact."

U.S. Pat. No. 8,041,365 "Location-Based Survey Via Mobile Device" (Gentle et al. Oct. 18, 2011) discloses, in the Abstract, "A system and method are provided for obtaining information on inquiries related to location dependent facts utilizing mobile networked communication devices and pre-selected respondents who obtain information on the requested facts. The system included a call center comprising a communication server and one or more work stations manned by call center agents. A plurality of respondents act as information gatherers to find answers to inquiries forwarded to the respondents by the call center. Customers first contact the call center, and inquiries are parsed for location and subject matter. The inquiry is then allocated to a qualified respondent within the area of the location of interest. The respondent gathers information necessary to answer the inquiry and forwards the answer to the call center, preferably by the use of the mobile networked communication device carried by the respondent. Respondents log in to the system indicating availability for servicing inquiries. Location tracking is provided so that the call center is aware of the locations of respondents. Global positioning satellite techniques as well as phone triangulation techniques may be used to track the respondents' locations."

U.S. Pat. No. 8,116,727 "Method and System for Determining and Presenting a Current Likelihood of a Mobile Station Successfully Engaging in a Communication Session" (Kates et al. Feb. 14, 2012) discloses, in the Abstract, "Methods and systems are provided for determining and presenting a current likelihood of a mobile station successfully engaging in a communication session. In an embodiment, the mobile station (or a network entity) records call data that is indicative of successful and unsuccessful attempts by the mobile station to engage in communication sessions over a period of time. The mobile station (or the network entity) determines, based at least in part on the recorded call data, a current likelihood of the mobile station successfully engaging in a communication session. The mobile station presents a forecast indication to a user of the mobile station, the forecast indication reflecting the determined current likelihood."

While the prior art focuses on coordinating scheduling, none of the above provide a system which passively monitors mobile device use and captures data for use in determining end user availability for best scheduling communication sessions. What is needed, therefore, is a system that overcomes the above-mentioned limitations and that includes the features enumerated above.

BRIEF SUMMARY

The disclosed system captures real-time data regarding a mobile device user's receptivity to interacting, need to interact, and likely availability for interacting; matches this data with that of a second party; and facilitates the connection of the mobile device user to the second party for a mutually beneficial interaction. The second party could be a friend or peer, or an organization/enterprise. Overall, the integrated system saves time, money, and effort of both parties by reducing or eliminating unnecessary attempts to connect where there is an insufficient likelihood of interaction success.

The system provides a service to personal mobile device users and other individuals and organizations subscribed to the service. The system consists of a mobile device application that interacts with a secure cloud-based computing infrastructure.

The mobile device application consists of sensing and data analysis software installed on consumers' mobile devices, which passively monitors interest, need, and availability data by monitoring a set of sensors built into the device, connected to the device, or collected by software operation on the device, and making computations, resulting in derived compact mobile sensing data for each mobile user.

The cloud-based computing infrastructure has facilities for data publishing, storage, computation, and security.

The mobile device application for each mobile device user subscribed to the service transmits derived mobile sensing data to the cloud-based computing infrastructure, which infers availability, interests, and/or needs based on each mobile user's sensing data, and publishes the inferred results to organizations and peers that the consumer has a relationship with and would be interested in interacting with (e.g. receiving telephone calls, chats). Each individual or organizational subscriber may receive the inferred status(es) and use it to schedule synchronous interactions (e.g. telephone calls, text chats) at appropriate and optimal times for both parties.

The use of passive monitoring means that the system does not rely on self-reporting from mobile device users (e.g. user identification of the best times to call), as self-reporting requires significant effort from users and can produce unreliable data if not maintained. Additionally, self-reporting may be based on user guesses, so passive sensing and automatic inference may further increase reliability of statuses.

There are multiple processes operated or enabled by the system, including:

1. Inferring Availability to Speak

In functional terms, the system collects mobile device sensor data passively; computes (either on the mobile device before transmission or on the cloud-based server after transmission) various user status values describing how likely it is to reach and have a quality synchronous interaction with the mobile user; transmits (pre- or post-computation) to a cloud-based server; and stores and serves user status values to other individual or organizational subscribers. The user status describes likely interaction success based on a number of directly measurable criteria, including, but not limited to, whether the user:

(i) has good signal strength;
(ii) is in a location where the user typically receives and places calls successfully;
(iii) has recently been interacting with device but is not currently on a call;
(iv) is not in the sort of motion that would make taking a call difficult (for example, running or on a bike); and/or
(v) does not have a scheduled event on their calendar.

2. Inferring Need/Interest in Speaking

In functional terms, the system collects mobile device sensor data passively; computes (either on the mobile device before transmission or on the cloud-based server after transmission) various user status values describing how likely it is to that the mobile user has a need or interest in speaking; transmits (pre- or post-computation) to a cloud-based server; and stores and serves user status values to other individual or organizational subscribers. The user status describes likely interaction success based on a number of directly and/or indirectly measurable criteria, including, but not limited to, whether the user:

(i) exhibits some form of psychological distress indicating need to speak;
(ii) feels extroverted and positive about interacting with other people;
(iii) is in a location that they are unfamiliar with and might like informational help; and/or
(iv) exhibits information hunting behavior, such as searching on a particular topic or using particular applications on their device.

Because user status is sensed passively and inferred automatically, no effort is required of the user to indicate need/interest. Because need/interest is inferred, a connection for a synchronous interaction is more likely to be valuable from the standpoint of both parties.

3. Messaging to Ask for Permission to Connect, Including Facilitating Authentication Notification and/or messaging is provided to initiate a connection. A user may act on the notification with a single action on their mobile device to approve the connection and automatically initiate the interaction, including authenticating identity.

By asking for permission, users feel empowered and respected, strengthening the relationship. By providing a single action, the connection attempt is very efficient for both parties. By automating the initiation of the interaction, the experience is effortless and eliminates the common practice of performing challenge-response questioning to verify user identity, saving time and cost.

4. Visualizing and Publishing Data to Users, Enterprise and Peers

Organizations with a population of customers who have installed the application on their mobile devices can see a continuously updated list of those users' receptivity, need and availability data, and use that data to select targets for outreach. The list may include a suggested schedule or ranking for outreach, based on inferred availability, interest, or other variables. Similarly, peers (for example friends and family), can see whether now is a good time to speak to a person in their contact list, and set up systems to receive notifications to speak to a person if the need and availability is right. The mobile-device user can see the data that they are publishing and adjust it or adjust data collection settings if necessary.

5. Ability to Select Who to Publish to and Ability to Withdraw that Permission

After installing the product, a mobile device user can control which organizations or peers will receive their receptivity, need and availability statuses. This provides privacy protection and control to users, while also allowing the benefit of better scheduled connections.

Features and Advantages

The system organizes interaction timing dynamically in real-time according to customer receptivity, need and availability, with automated passive monitoring ensuring that there is no creation of an undue data maintenance burden.

The system reduces the effort required for consumers to connect with each other for synchronous human-to-human interaction.

Understanding consumer's receptivity, need and availability, as enabled by the system, has broader uses in the scheduling of rich media advertising delivery, and timing automated requests to perform tasks such as filling in surveys.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

The terminology and definitions of the prior art are not necessarily consistent with the terminology and definitions of the current invention. Where there is a conflict, the following definitions apply.

System: The associated hardware, software, data, and protocols.

Service: The usage enabled by the System for connecting subscribers to mobile device users.

Subscriber: An individual or organization participating in the Service. Each Subscriber is registered and has authentication credentials. Subscribers include those who wish to synchronize connection to or from (or both to and from) other Subscribers. Subscribers initiate Connection Requests.

User: An individual Subscriber who is a mobile device user, wishes to synchronize contact *from* other Subscribers, and is willing to provide personal mobile device data to facilitate synchronized contact *to* other Users.

Connection: A synchronous connection which requires two Subscribers to be on the same network (e.g. the PSTN, the Internet) at the same time.

Connection Request: A signal from Subscriber to User indicating that the Subscriber wishes establish a Connection with the User.

Connection Accept: A signal from User in response to a Connection Request indicating that the Connection Request is accepted and authorizing action to be taken by the System to initiate the Connection.

Authentication Token: A signal from User containing the information to verify to the Subscriber initiating a Connection that the User and/or Mobile Device is indeed the party on the other end of the Connection.

Probe: A Probe represents an interface to some time-varying state on the mobile device that is affected by User behaviors or actions. A Probe may be a physical sensor (e.g. GPS, accelerometer, external heart rate monitor) or a file of User information (e.g. User call log, User SMS log, User survey results). Probes include hardware sensor values, stored device activity and configuration information, and collected user information.

Probe Data: Data returned by Probes representing time-varying state affected by User behaviors or actions.

Raw Probe Data (Probe Data): Unprocessed data taken from Probes on the mobile device. This data can be voluminous and is typically not efficient to transmit in raw form.

Compact Probe Data (Probe Data): Processed Probe Data in a compact form suitable for efficient transmission.

Probe Config File: File containing settings pertaining to Probe Data collection, including whether each Probe is enabled, configuration parameters for each Probe, collection timing for each Probe, and Probe Data aggregation and transmission parameters.

Probe Datastore: A storage mechanism on the Mobile Device for aggregating and persistently storing Probe Data.

Receptivity Model: A mathematical or logical model that takes input from various User Probe Data and whose output is a probability that the User would be receptive to being contacted at this time.

Availability: A User is considered Available if their mobile device is reachable and the User scores above a threshold on a Receptivity Model (including possibly the trivial Receptivity Model).

Subscriber-User Benefit Model: A mathematical or logical model that takes input from various User Probe Data and whose output is a probability that the User would benefit from being contacted by a particular Subscriber at this time.

Interest: A User is considered to have an Interest in a synchronous interaction with a Subscriber if the User scores above a threshold on a Subscriber-User Benefit Model associated with the pairing between a particular Subscriber and User.

User Status Data: Time-varying data associated with a User that describes the user's status with respect to Availability and Interest.

Subscriber Contact: A Subscriber that a User has a relationship with and chooses to allow to monitor self User Status Data for connection opportunities.

User Sharing Data: Data associated with a User that specifies Subscriber Contacts and the permissions they are granted with respect to User Status Data.

Mobile Device: A portable personal computational device that is typically carried on a person (e.g. a "smartphone", a "PDA"); the has the ability to communicate over wireless channels (e.g. "WiFi" (IEEE 802.11), cellular data networks); and that can load and run software programs.

Cloud Device: A set of hardware on a public wide-area network (WAN) (e.g. the Internet) that can run services, store data, and perform computations.

Cloud Sensor Collection Service: Service on the Cloud Device that collects Compact Probe Data from Mobile Devices.

Cloud User Status Service: Service on the Cloud Device that publishes User Status and User Sharing Data to Subscribers according to permissions in User Sharing Data.

Cloud Connection Service: Service on the Cloud Device that manages initiation and authentication of Connections.

Cloud Status Inference Engine: Service on the Cloud Device that computes User Status Data from Compact Sensor Data.

Cloud Web Services: Service on the Cloud Device that provides web application services to Subscribers.

Operation

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present invention.

Figure 1:
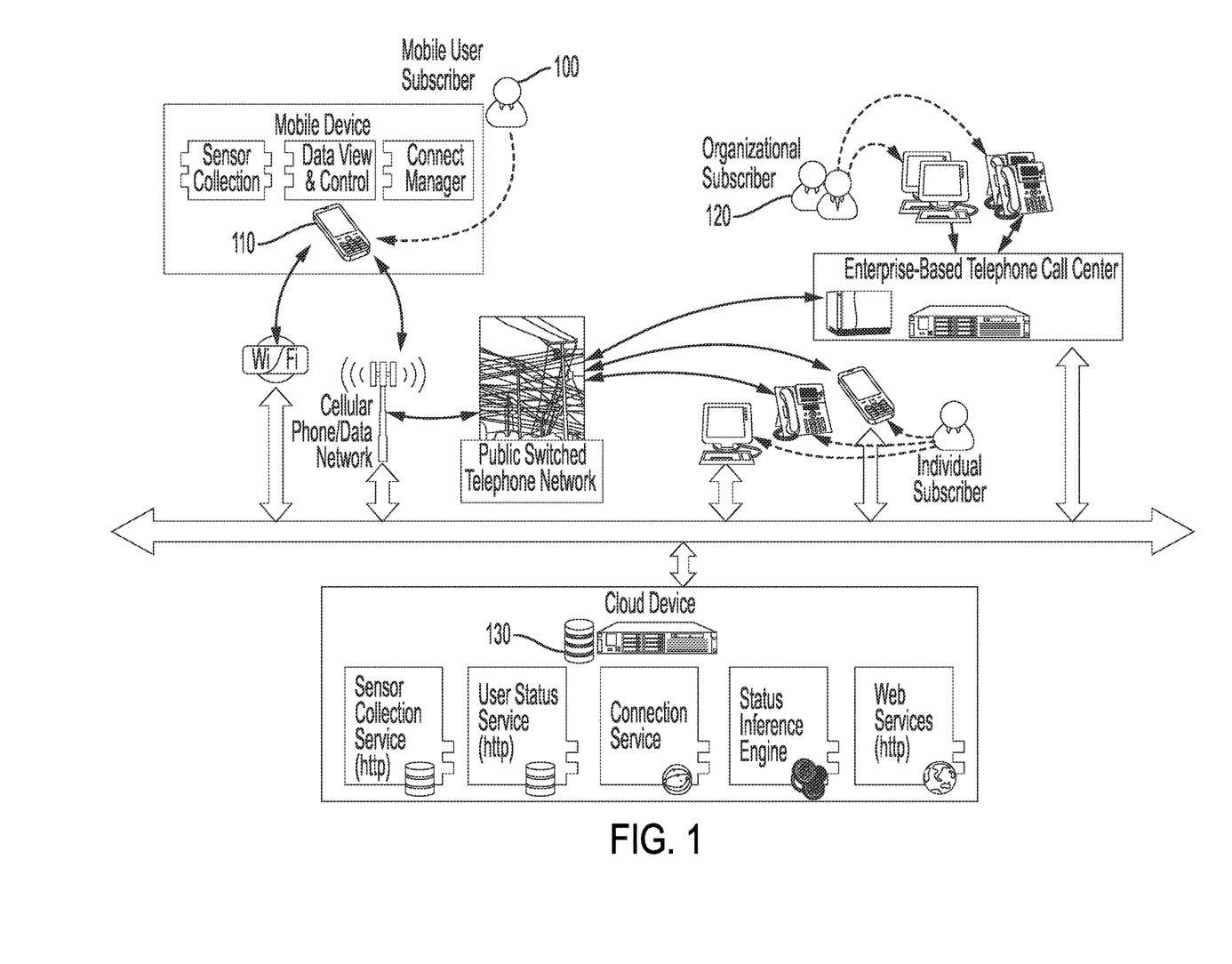
FIG. 1 is diagram of the overall system.

Referring to FIG. 1, an application operating on mobile devices 110 of end users 100 communicates with software operated by cloud device 130 to coordinate communications between subscribers, including end users and organizations 120. The mobile device application collects data about user availability and interests in communication, displays availability information of contacts tracked in the mobile device, and enables the end user to accept or initiate communication requests. Cloud system software processes and analyzes data collected by the mobile device application to determine availability and interests of the end user, and coordinates exchange of such information as well as communication requests between subscribers.

Mobile Device

Mobile device 110 is any mobile computing device, for example smart phones such as those operating iOS or Android. In the preferred embodiment a mobile device must be able to operate mobile device application software, but dedicated mobile devices with the application software implemented in hardware may also be used.

Figure 2:
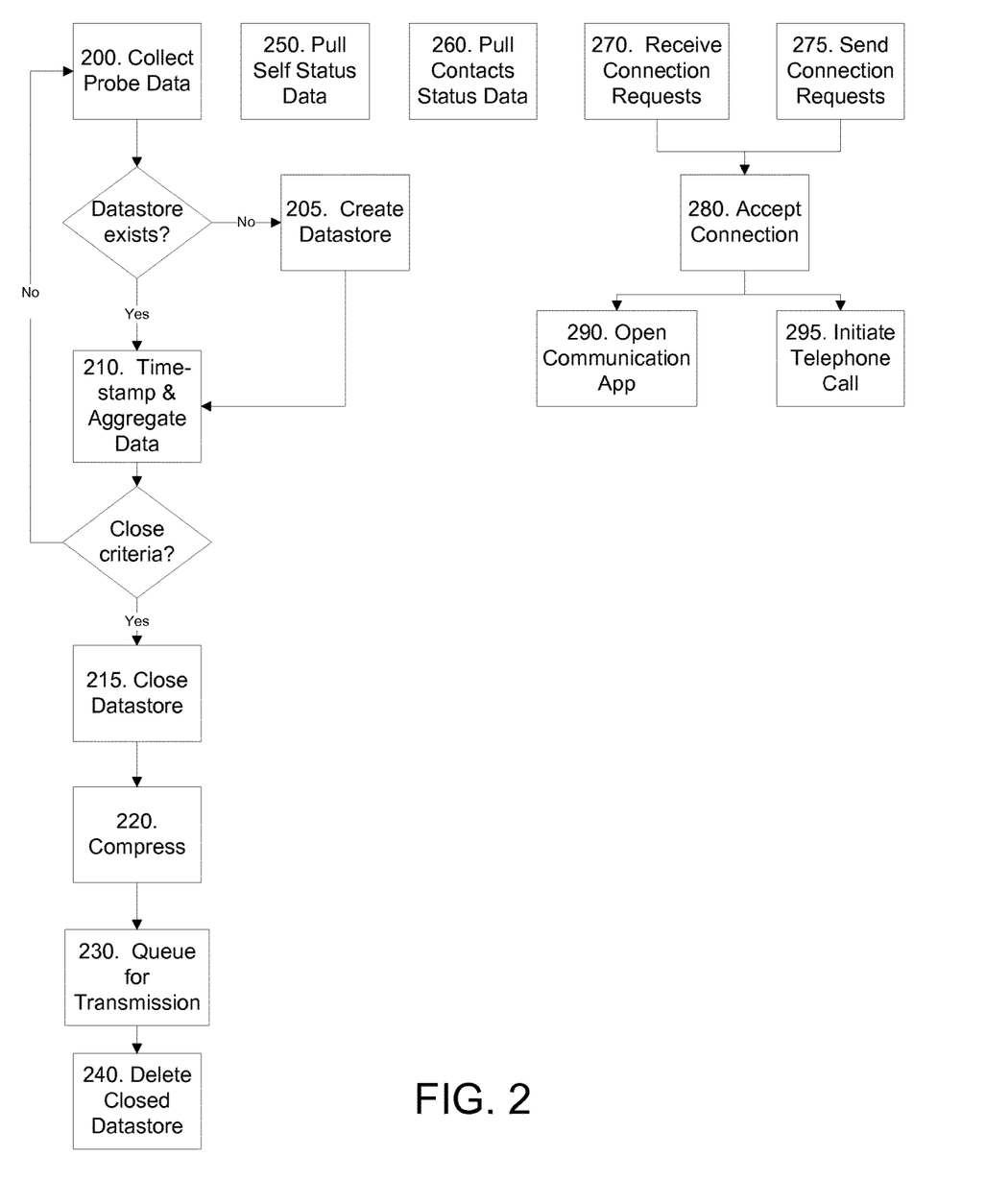
FIG. 2 is a flowchart showing process flow for a mobile application.

Referring also to FIG. 2, the mobile device operates application software which collects 200 raw probe data from physical probes or data probes. Physical probes may be internal to the mobile device or externally connected, such as via Bluetooth or USB. Examples of physical probes include, but are not limited to, clock, accelerometers, gyroscope sensors, location, battery status, signal strength, and microphones. Data probes are files or data stored on the mobile device which can be used to determine past behavior and/or interests. Examples of data probes include, but are not limited to, call logs, text message logs, survey results, search history, contacts, calendar, and application usage.

The mobile device application operates a service to passively collect raw probe data. In a preferred embodiment, the service does so through operating system API calls to access probe data either directly through hardware device access or through file system access. A probe config file specifies which probes are enabled for data collection, configuration for each probe, and the timing of probe collection. Settings in the config file may be changed by the end user through a user interface operated by the mobile device application, or via a online web page which updates a cloud service with setting changes to be pushed or pulled to the mobile device application. The mobile device service may periodically poll the config file for changes, or update any configurations upon receiving a signal that the config file has changed.

Probes may return data in different, probe-specific data structures. Collected probe data is time-stamped and aggregated 210 into an active probe datastore. In a preferred embodiment, the probe config file and raw probe data are stored as JSON documents. In such an embodiment, the probe datastore may be a SQLite database file, with each row storing a probe's data JSON file as a string, and each row also storing probe identification and timestamp. The probe datastore is preferably stored within protected application storage space, such as in a main memory card of the memory device, and may be named to identify between active and prior probe datastore files. If no active datastore exists, a new probe datastore may be created 205 when probe data is available for aggregation.

The active probe datastore may be closed 215 based on either a) file-size and/or frequency parameters, which may be set within the probe config file; and/or b) request received from the cloud sensor collection service. Such request from the cloud sensor collection service is preferably received when the cloud sensor collection service needs the probe data for processing, such as for periodic updates or when a current availability status update is needed. Requests from the cloud sensor collection service may be pushed from the phone service to the mobile device, or pulled by the mobile device such as through a periodic polling of the cloud service. After closing the active probe datastore, that datastore is compressed 220 and queued for transmission 230 to the cloud sensor collection service, and a new active datastore may be created 205. Compression is optional, but preferred to reduce data transmission required, and may be done by various methods such as use of the IEEE RFC 1951 algorithm DEFLATE. Successful transmission of the compressed datastore may be confirmed by handshakes between the mobile device application and the cloud sensor collection service, after which the compressed datastore may be deleted 240 from the mobile device.

For transmission of the datastore, the mobile device uses WiFi if available, and a cellular data network if WiFi is not available, to securely transmit the datastore, such as using HTTPS. End user account credentials and mobile device identifier are transmitted with the datastore so that the cloud sensor collection service can correctly attribute the probe data. If transmission is not successful, or no data network for transmission is available, the datastore may be queued for later transmission. In such situation, multiple compressed datastores may be stored on the mobile device until transmission to the cloud sensor collection service is successful.

In addition to probe data collection, configuration, and transmission, the mobile device application may provide other features to the end user. For example, the mobile device may pull 250 user status data for the end user from the cloud user status service. Such self-status data may be useful to verify correct status and sensor collection operation. Additionally, the mobile device application may pull 260 user status data for subscribers who are contacts tracked in the mobile device of the end user. A graphical user interface (GUI) of the mobile device application may display such availability statuses on the mobile device. Such GUI may also allow view and configuration of user sharing settings—such as enabling who can view the end user's status, and what degree of interest or availability data may be shared. Sharing settings may be configured differently for each probe, and/or for each individual subscriber, in order to tailor specific relationships. For example, general search data may be made available to specific or general commercial entities, similar to Amazon or Google tracking customer interests, or disabled to maximize privacy protection. Healthcare provider subscribers with a relationship to the user, such as a doctor or specific medical advisor, may be authorized to access probe data for relevant probes, such as monitors external to the mobile device or healthcare-related applications run on the mobile device. These differing settings allow the cloud device to calculate user status for different variables, such as availability for communication or interest in a specific field or need, depending on user permissions. When changes are made to user sharing settings, the mobile device application communicates with the cloud user status service to update sharing settings.

A connection manager may operate as a separate GUI or as part of the status and configuration GUI. The connection manager communicates with the cloud connection service to receive 270 or send 275 connection requests. Upon receipt of a connection request, the connection manager displays an interface option to accept 280 the request, which automatically opens 290 a communication program if specified providing audio and/or video communication with the requesting subscriber, or initiates 295 a telephone call to the requesting subscriber.

Cloud Device

Cloud device 130 may be implemented as one or multiple network addressable computer servers having or able to access computer processors and data storage. The cloud device operates multiple services, which may be implemented collectively as a single program, separately as individual programs, or in various combinations. The services include a cloud sensor collection service, a cloud user status service, a cloud connection service, and web services to provide a management interface to manage the cloud device, manage individual subscriber accounts, and view data apart from access through a mobile device. Additionally, the cloud device operates a cloud status inference engine to infer user status.

Cloud Sensor Collection Service

Figure 3:
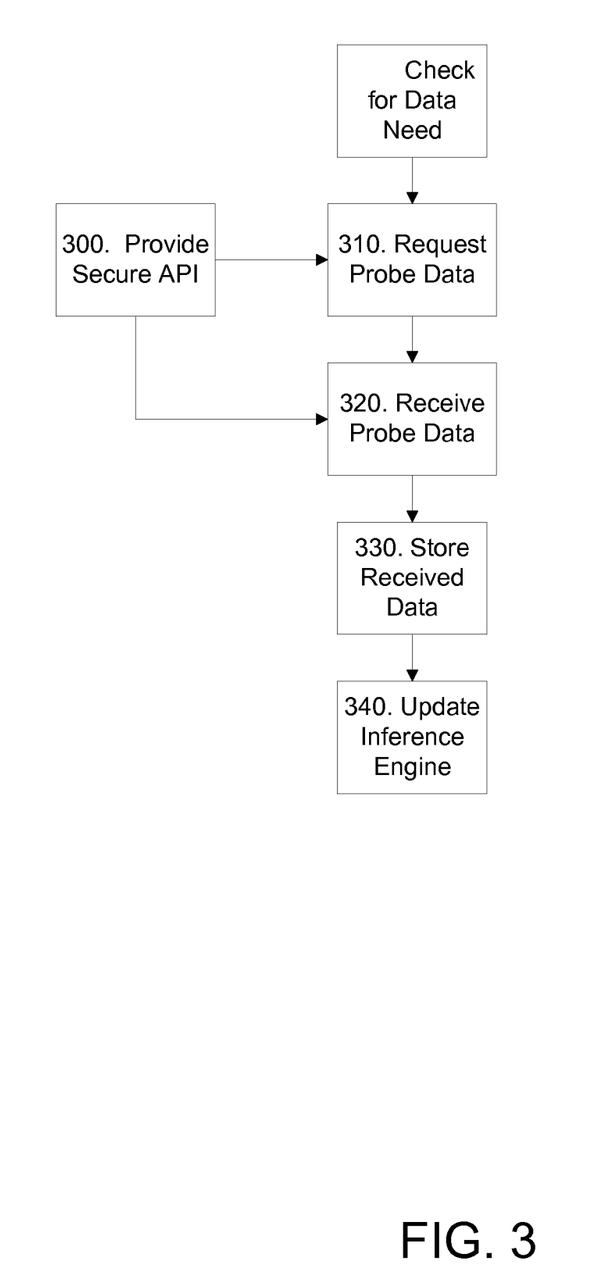
FIG. 3 is a flowchart showing process flow for a sensor collection service.

Referring also to FIG. 3, the cloud sensor collection service provides 300 a secure API for communication with mobile devices of subscribers related to collected probe data. The cloud sensor collection service can request 310 compact probe data from one or more mobile devices, and receive 320 compact probe data uploaded from a mobile device in response to the request or on uploads initiated by the mobile device. The cloud sensor collection service stores 330 the received compact probe data in storage accessible by the cloud status inference engine, and the cloud sensor collection service may initiate 340 an update operation of the cloud status inference engine.

Cloud User Status Service

Figure 4:
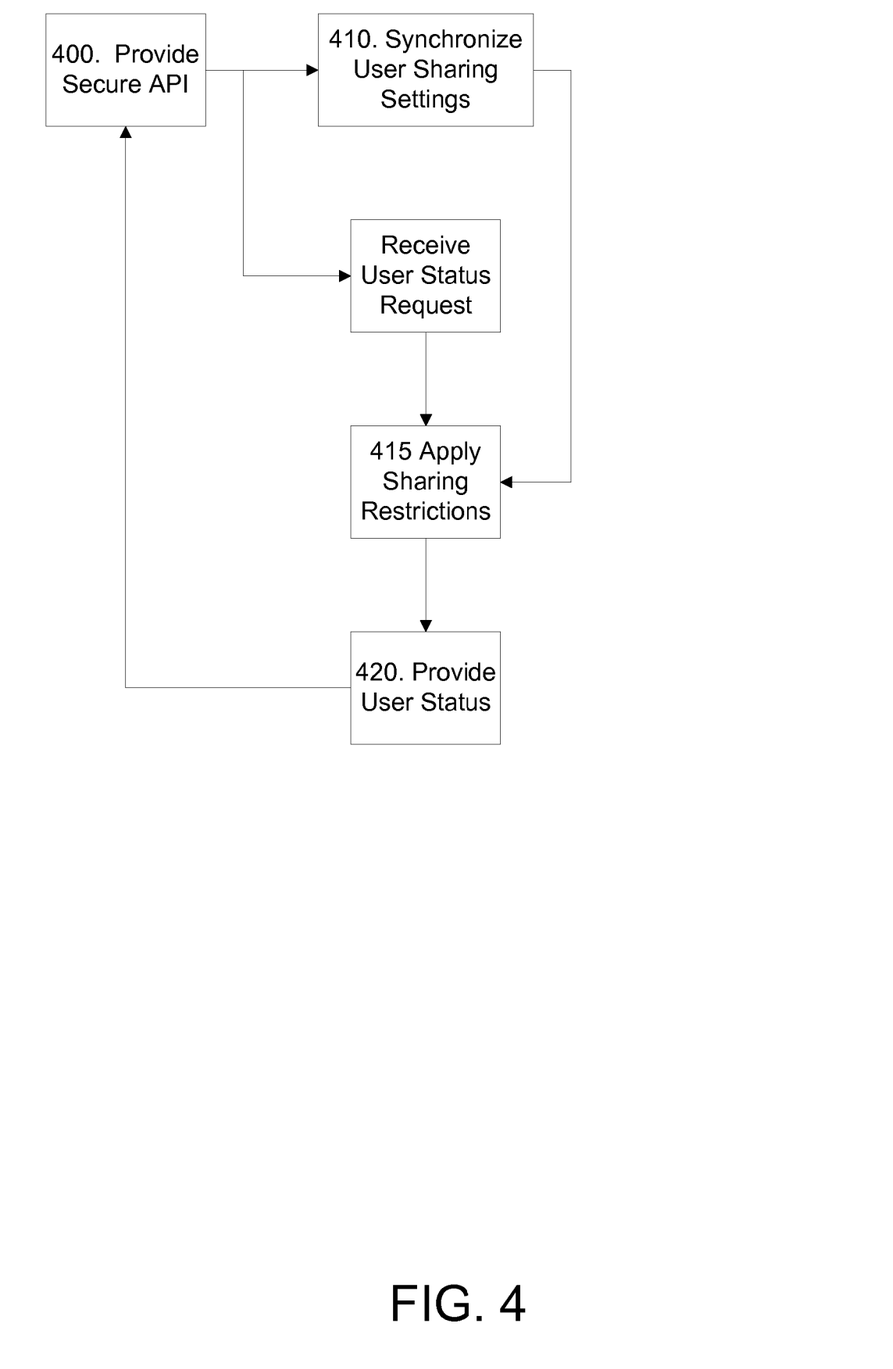
FIG. 4 is a flowchart showing process flow for a user status service.

Referring also to FIG. 4, the cloud user status service provides 400 a secure API for communication about user status and user sharing data with mobile devices or computers of subscribers. The cloud user status service synchronizes 410 user sharing data settings with mobile devices, and stores any changes received from mobile devices. The cloud user status service further allows download of user status data to subscribers upon request, and applies 415 any user sharing restrictions before providing 420 user status in response to requests. For example, if a user has set permissions in user sharing data to private (not shared) with all except individually identified subscribers, only those identified subscribers can receive user status data about the user. The cloud user status service also requests or signals the cloud sensor collection service to request probe data from a mobile device if recent enough data does not exist for that device.

Cloud Connection Service

Figure 5:
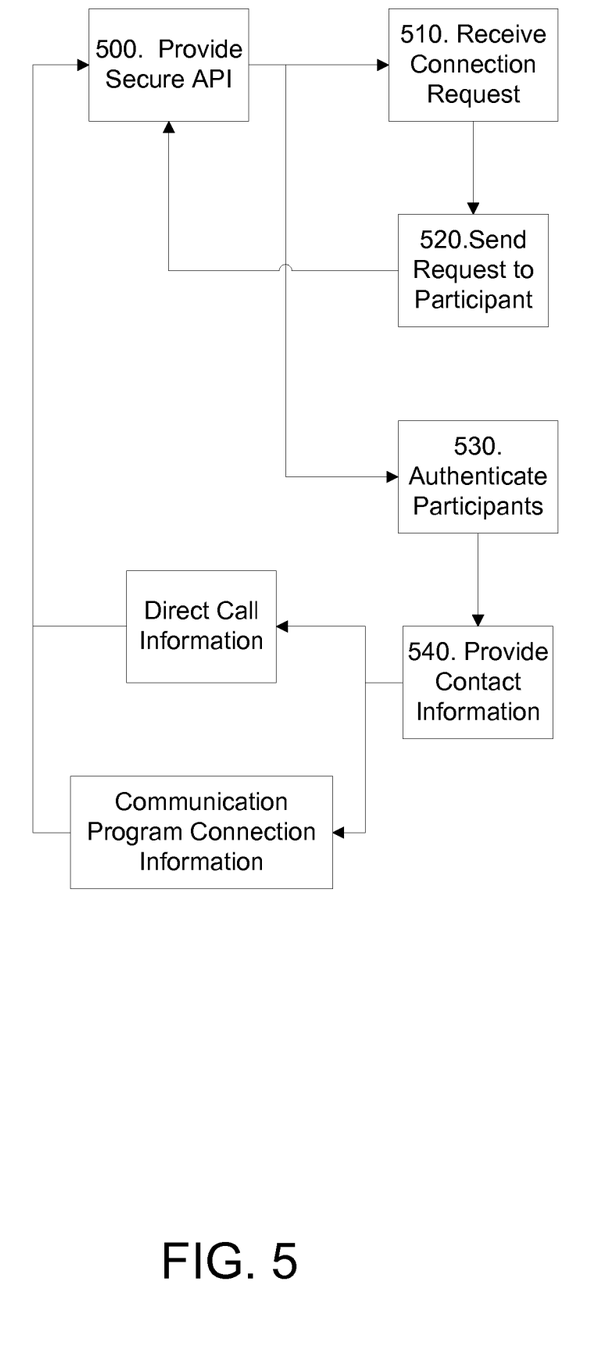
FIG. 5 is a flowchart showing process flow for a connection service.

Referring also to FIG. 5, the cloud connection service provides 500 a secure API for mobile devices and other computing devices of subscribers related to connection requests. A subscriber initiates a connection request through the mobile device application or a software program operating on a non-mobile computing device. Cloud connection service receives 510 the request. After receipt, cloud connection service sends 520 the request to the mobile device of the requested end user. If the end user accepts the request, the cloud connection service may authenticate 530 the end user and provide 540 direct contact information, such as a phone number for direct calling or other identification for connection by another communication platform.

Cloud Status Inference Engine

Figure 6:
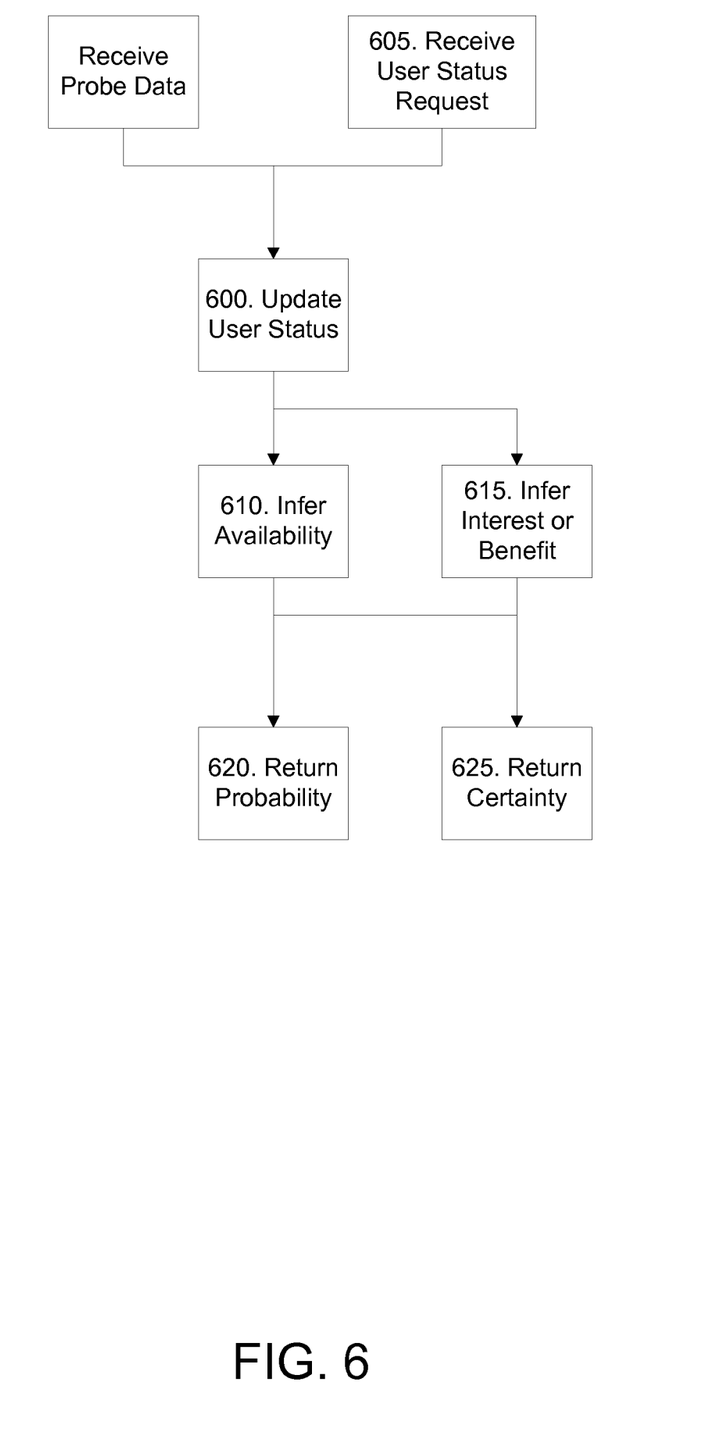
FIG. 6 is a flowchart showing process flow for an inference engine service.

Referring also to FIG. 6, the cloud device also operates the cloud status inference engine. The cloud device may be configured to operate and update 600 user status for an end user every time probe data is received for that user, or to operate dynamically 605 upon request of user status to determine relevant user availability status specific for the requester. The inference engine uses stored probe data to infer 610 user availability, and optionally infers 615 interest or other variables that subscribers may use in determining whether to initiate an interaction. For availability and any other calculated variables, the inference engine stores or returns 620 a result and also stores or returns 625 a certainty of the result.

To infer availability of a user, the inference engine processes probe data from that user through a receptivity model. The receptivity model produces an output value indicative of the probability of the user's availability. Different model and system settings may result in different treatments of output values. For example, in a preferred embodiment such probability can be returned to requesting participants for their decision about availability, while in alternate embodiments the output may be considered "available" if at or above a configured threshold value, and "unavailable" if below such threshold. Additionally, the receptivity model may output a degree of certainty about the output value.

Different inference engine receptivity models may be used based on system, user, or requesting participant settings. For example, a context-independent model for inferring availability may factor most recently reported signal strength, calendar events, present device interaction activity and/or historical device interaction activity near the current time, present call activity and/or historical call activity near the current time, device motion (i.e. not operating a vehicle), and present ambient noise (to determine if in a loud or quiet location). Such a model may be trained 630 using supervised learning from a collection of known examples. Alternative to context-independent, a user-specific context model may be used. For example, availability tailored to a specific user may additionally depend on location of calls and bluetooth data to determine if the user is in a favored location to take calls, such as a location from which the user frequently places outgoing calls, or at home as opposed to in a car. Such a model may be trained 630 using supervised learning on collected signal data for the specific individual. Choice of which model to use may be made system-wide, or may be made dynamically such as based on user settings or requesting participant settings matched with user permissions.

User interests may be similarly be inferred by the inference engine through use of one or more subscriber-benefit models. A subscriber-benefit model processes probe data received from a user to output a probability value of benefit to the user for contact with a specific subscriber, or for relation to a subject of interest associated with a specific subscriber. The output value may be returned to a requesting subscriber for subscriber analysis of interest. Alternatively, benefit or interest may be identified for all values at or over a configured threshold, and no benefit or no interest for all value below such threshold. Additionally, the subscriber-benefit model may output a degree of certainty about the output value.

Similar to receptivity models, different subscriber-benefit models may be used. For example, a context-independent model for interest may be based on application usage, such as search data, map data, or use of specific apps such as healthcare apps. Such a model could also look for context-independent distress using the microphone probe to pick up high vocal effort. Alternatively, a user-specific context model may be used. For example, interest may be inferred based on probe data specific to a user-subscriber relationship. For a mental healthcare relationship, a user under care for post-traumatic stress or depression may prioritize changes in communication patterns, such as call logs and sms logs, or changes in location behavior, as indicative of interest in needing help. The microphone probe may record vocal differences from normal, such as speaking with a breathy or strained voice or having flat vocal affect. Similar probe data may be used between a nursing or other health provider subscriber and an elderly user. In such relationship-based contexts, both subscribers may authorize use of the specific model desired between the monitoring subscriber and the user.

Both context-independent and contextual computational models may be developed in multiple ways. One preferred method to develop such models is to use supervised learning techniques, in which features derived from probe data are paired with ground-truth values of user status data from a representative sample of data. These example pairs are used along with statistical methods to compute mathematical relationships between the inputs and outputs. Models may be refined indefinitely as new pairs of data are collected. The system may be used for collecting these pairs of data.

Cloud Web Services

The cloud device may also provide web services, with a browser- or application-driven interface, for Subscribers to access. For end users, access may be to adjust settings separate than through a mobile device. For organizations, access may be to adjust settings, configure and/or request user-specific inference model usage and related probe data permissions, and visualization of usage and history.

Other Embodiments

In addition to traditional smart phone mobile devices, any wearable computing device, such as a watch or glasses, may function as the mobile device of an end user. Additionally, non-mobile computers may be used in the same fashion as mobile devices. For example, computerized phone systems may track organizational call logs as probe data for use identifying the best time to call. Other probe data, such as health monitors, may be collected by non-mobile computers including traditional desktop computers or other devices such as computerized workout equipment. Multiple computing devices may also provide probe data for the same individual user, with the data compiled together by the cloud sensor collection service.

Historical data and analysis, including history of user status inferences, may be made available through an API, through the cloud web services, or through the mobile device application. Self-specific data may be provided in detailed granularity to the individual user, while general data and trends with granularity that prevents identification of individual users made available for general reporting.

Historical data, including inferences and acceptance or rejection of connection requests, may also be used to improve accuracy of receptivity models and/or subscriber-benefit models, or as the basis, including training data, to create new receptivity and/or subscriber-benefit models.

Alternative to a publicly accessible service, the cloud device may be implemented within a closed, private network for a specific purpose use. In addition to traditional cloud computing concepts, peer-to-peer processing may be used to provide cloud device functionality. In a peer-to-peer arrangement, the mobile device application may operate the inference engine and publish user status to peer devices, which may in turn distribute that user status to other peer devices.

Alternative to arranging direct telephone calls or connection via other communication software, the request and connection may coordinate any type of communication connection, including scheduling of future appointments or in-person visits.

Alternative to scheduling person-to-person communications, the system may be used to coordinate and schedule content delivery, such as video or advertisements from a subscriber to one or more specific end users.

In addition to identifying available users and initiating immediate connections, the system may enable watch lists to coordinate next available connections. For example, if connection is desired to a user but that user is currently unavailable, another subscriber may request (through the mobile device application or through a cloud web services request) to set up a connection when both parties are next available. This triggers a cloud device monitoring of the status of both the requesting subscriber and the user targeted for communication, and when both are inferred to be available a connection request may then be sent to both parties. This same process may be used for coordinating connections involving three or more parties, such as conference calls, at a next available time all parties are inferred to be available.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

We claim:

1. A computer-implemented method for initiating communication, the method comprising:
using at least one hardware processor for extracting code for:
receiving passively sensed data from a first user having an associated first user device;
receiving second user data from one or more second users having an associated second user device;
operating an inference engine to execute a subscriber-benefit model process to calculate one or more interest output values indicative of the interest of the user to internet based on robe data, and determine, from the robe data, elocution or articulation patterns of the user;
operating a cloud user status service, which synchronizes user sharing settings received from the mobile communication device, and provides the one or more availability output values and the one or more interest output values to the mobile communication device and an additional mobile communication device of an additional subscriber;
receiving, from the additional mobile communication device of an additional subscriber, a connection request to the mobile communication device of the user upon initiation action from the additional subscriber when the one or more availability output values are above a configured threshold value indicating that user is available for communication; and
transmitting the connection request to the mobile communication device of the user, wherein the application is configured to operate a connection manager graphical user interface to display, upon receipt of the connection request, an interface for the user to: either reject a received communication request or accept the received communication request and automatically initiate a communication connection by direct phone call or communication software.

2. The computer-implemented method of claim 1, further comprising:
generating inference data based, at least in part on the received passively sensed data that includes an indication that the first user has an interest to communicate with one or more second users; and
utilizing the generated inference data to select one or more of the second users.

3. The computer-implemented method of claim 2, further comprising updating the inference data following the initiation of a communication session.

4. The computer-implemented method of claim 1, wherein the subscriber-benefit model process calculates a need for interaction by the first user.

5. The computer-implemented method of claim 1, wherein operating the inference engine further comprises determining a likelihood of a successful connection between the first user and one or more of the second users.

6. The computer-implemented method of claim 1, further comprising transmitting the received passively sensed data to one or more peer devices.

7. The computer-implemented method of claim 1, wherein the availability output values further comprise:
identifying a signal strength of the first user device and one or more of the second user devices; or
identifying a location of the first user device and one or more of the second user devices; or
identifying a recent interaction of the first user device and one or more of the second user devices; or
identifying activity of the first user device and one or more of the second user devices; or
identifying scheduled events of the first user device and one or more of the second user devices.

8. The method of claim 1, wherein the passively sensed data is independent of self-reporting.

9. A method for initiating communication, the method comprising:
receiving passively sensed data from a first user having an associated first user device;
receiving second user data from one or more second users having an associated second user device;
operating an inference engine to execute a subscriber-benefit model process to calculate one or more interest output values indicative of the interest of the user to interact based on probe data, and determine, from the probe data, elocution or articulation patterns of the user;
operating a cloud user status service, which synchronizes user sharing settings received from the mobile communication device, and provides the one or more availability output values and the one or more interest output values to the mobile communication device and an additional mobile communication device of an additional subscriber;
receiving, from the additional mobile communication device of an additional subscriber, a connection request to the mobile communication device of the user upon initiation action from the additional subscriber when the one or more availability output values are above a configured threshold value indicating that user is available for communication; and
transmitting the connection request to the mobile communication device of the user, wherein the application is configured to operate a connection manager graphical user interface to display, upon receipt of the connection request, an interface for the user to: either reject a received communication request or accept the received communication request and automatically initiate a communication connection by direct phone call or communication software.

10. The method of claim 9, further comprising:
generating inference data based, at least in part, on the received passively sensed data that includes an indication that the first user has an interest to communicate with one or more second users; and
utilizing the generated inference data to select one or more of the second users.

11. The method of claim 10, further comprising updating the inference data following the initiation of a communication session.

12. The method of claim 9, wherein the subscriber-benefit model process calculates a need for interaction by the first user.

13. The method of claim 9, wherein operating the inference engine further comprises determining a likelihood of a successful connection between the first user and one or more of the second users.

14. The method of claim 9, further comprising transmitting the received passively sensed data to one or more peer devices.

15. The method of claim 9, wherein the availability output value further comprises:
- identifying a signal strength of the first user device and one or more of the second user devices;
- identifying a location of the first user device and one or more of the second user devices;
- identifying a recent interaction of the first user device and one or more of the second user devices;
- identifying activity of the first user device and one or more of the second user devices; and
- identifying scheduled events of the first user device and one or more of the second user devices.

16. The method of claim 9, wherein the passively sensed data is independent of self-reporting.

17. A system for synchronizing communication, comprising:
- one or more memories configured to store representations of data in an electronic form; and
- one or more processors, operatively coupled to one or more of the memories, the processors configured to access the data and process the data to:
  - receive passively sensed data from a first user having an associated first user device,
  - receive second user data from one or more second users having an associated second user device,
  - operating an inference engine to execute a subscriber-benefit model process to calculate one or more interest output values indicative of the interest of the user to interact based on probe data, and determine, from the probe data, elocution or articulation patterns of the user,
  - operating a cloud user status service, which synchronizes user sharing settings received from the mobile communication device, and provides the one or more availability output values and the one or more interest output values to the mobile communication device and an additional mobile communication device of a additional subscriber,
  - receiving, from the additional mobile communication device of an additional subscriber, a connection request to the mobile communication device of the user upon initiation action from the additional subscriber when the one or more availability output values are above a configured threshold value indicating that user is available for communication, and
  - transmitting the connection request to the mobile communication device of the user, wherein the application is configured to operate a connection manager graphical user interface to display, upon receipt of the connection request, an interface for the user to: either reject a received communication request or accept the received communication request and automatically initiate a communication connection by direct phone call or communication software.

18. The system of claim 17, wherein the processors are further configured to:
- generate inference data based, at least in part, on the received passively sensed data that includes an indication that the first user has an interest to communicate with one or more second users; and
- utilize the generated inference data to select one of more second users.

19. The system of claim 17, wherein the processors are further configured to update the inference data following the initiation of a communication session.

20. The system of claim 17, wherein the passively sensed data includes a need for interaction by the first user.

21. The system of claim 17, wherein to determine availability data, the processors are further configured to determine a likelihood of a successful connection between the first user and one or more of the second users.

22. The system of claim 17, wherein the processors are further configured to transmit the received passively sensed data to one or more peer devices.

23. The system of claim 17, wherein to determine availability data, the processors are further configured to:
- identify a signal strength of the first user device and one or more of the second user devices;
- identify a location of the first user device and one or more of the second user devices;
- identify a recent interaction of the first user device and one or more of the second user devices;
- identify an activity of the first user device and one or more of the second user devices; and
- identify scheduled events of the first user device and one or more of the second user devices.

24. The system of claim 17, wherein the passively sensed data is independent of self-reporting.

\* \* \* \* \*